United States Patent [19]

Horn et al.

[11] Patent Number: 5,334,620

[45] Date of Patent: Aug. 2, 1994

[54] PRODUCTION OF CHLOROFLUOROCARBON-FREE, URETHANE-CONTAINING MOLDINGS HAVING A CELLULAR CORE AND A COMPACTED PERIPHERAL ZONE

[75] Inventors: Peter Horn, Heidelberg; Ulrich Mueller, Neustadt; Wolfgang Hoelderich, Frankenthal; Ulf Sattler, Rieste; Rudolf Taddey, Damme; Dieter Tintelnot, Diepholz, all of Fed. Rep. of Germany

[73] Assignee: BASF Aktiengesellschaft, Fed. Rep. of Germany

[21] Appl. No.: 896,295

[22] Filed: Jun. 10, 1992

[51] Int. Cl.$^5$ .............. C08J 9/08; C08J 9/12; C08K 3/36
[52] U.S. Cl. ................. 521/51; 521/122; 521/123; 521/130; 521/133; 521/155; 521/170; 264/45.5
[58] Field of Search ............ 521/51, 122, 123, 130, 521/133, 155, 170; 264/45.5

[56] References Cited

U.S. PATENT DOCUMENTS

| | | | |
|---|---|---|---|
| 4,293,657 | 10/1981 | Nissen et al. | 521/122 |
| 4,431,753 | 2/1984 | Casati et al. | 521/51 |
| 4,518,718 | 5/1985 | Frost | 521/122 |
| 4,544,677 | 10/1985 | Allen et al. | 521/134 |
| 4,546,165 | 10/1985 | Grögler et al. | 521/137 |
| 4,621,104 | 11/1986 | Dietrich et al. | 521/159 |
| 4,667,008 | 5/1987 | Grögler et al. | 521/51 |
| 4,716,182 | 12/1987 | Hess et al. | 521/163 |
| 4,882,363 | 11/1989 | Neuhaus et al. | 521/122 |
| 5,110,834 | 5/1992 | Horn et al. | 521/125 |
| 5,177,117 | 1/1993 | Coe et al. | 521/122 |
| 5,254,597 | 10/1993 | Horn et al. | 521/51 |

FOREIGN PATENT DOCUMENTS 0319866 6/1989 European Pat. Off. .
1203458 10/1965 Fed. Rep. of Germany .
1533989 11/1978 United Kingdom .

OTHER PUBLICATIONS

Sax et al; *Hawley's Condensed Chemical Dictionary; Eleventh Edition;* Van Nostrand Reinhold; New York; 1987; pp. 1038, 1248, and 1249.

Primary Examiner—John Kight, III
Assistant Examiner—Rabon Sergent
Attorney, Agent, or Firm—Dennis V. Carmen

[57] ABSTRACT

A process for the production of fluorochlorocarbon-free, urethane-containing, soft-elastic, semirigid or rigid moldings having a cellular core and a compacted peripheral zone and an essentially pore-free, smooth surface involves reacting a) an organic and/or modified organic polyisocyanate with
b) at least one relatively high-molecular-weight compound containing at least two reactive hydrogen atoms, and, if desired,
c) a low-molecular-weight chain extender and/or cross-linking agent, in the presence of
d) a blowing agent,
e) a catalyst,
f) at least one amorphous, microporous silica gel which preferably has a mean pore diameter with a frequency of occurrence of more than 40% in the range from 0.1 to 10 nm, a pore volume of from 0.15 to 1.8 ml/g and a BET surface area of from 200 to 900 m$^2$/g, and, if desired, further additives and
g) assistants, in a closed mold with compaction.

17 Claims, No Drawings

PRODUCTION OF CHLOROFLUOROCARBON-FREE, URETHANE-CONTAINING MOLDINGS HAVING A CELLULAR CORE AND A COMPACTED PERIPHERAL ZONE

The present invention relates to a process for the production of chlorofluorocarbon-free urethane-containing soft-elastic, semirigid or rigid moldings having a cellular core and a compacted peripheral zone and having an essentially pore-free, smooth surface, known as structural polyurethane (PU) foams, by reacting conventional starting components for the formation of polyisocyanate polyaddition products in the presence of water and/or an inert physical blowing agent (with the exception of chlorofluorocarbons) a catalyst, an amorphous, microporous silica gel, and, if desired, further additives and assistants.

The production of moldings having a cellular core and a compacted peripheral zone by reacting an organic polyisocyanate, a relatively high-molecular-weight compound containing at least two reactive hydrogen atoms and, if desired, a chain extender and/or crosslinking agent in the presence of a blowing agent, preferably a physical blowing agent, a catalyst, and assistants and/or additives in a closed, heated or unheated mold has been known for a long time and is described, for example, in German Laid-Open Application DE-OS 16 94 138 (GB 1,209,243), German Patent DE-PS 19 55 891 (GB 1,321,679) and German Published Application DE-AS 17 69 886 (U.S. Pat. No. 3,824,199).

A review on moldings of this type, known as structural polyurethane foes, has been published, for example, in Kunststoff-Handbuch, Volume 7, Polyurethane, edited by Dr. G. Oertel, Carl-Hanser-Verlag, Munich, Vienna, 2nd Edition, 1983, pages 333ff., and in Integralschaumstoffe by Dr. H. Piechota and Dr. H. Röhr, Carl-Hanser-Verlag, Munich, Vienna, 1975.

Although the production of soft-elastic, semi-rigid or rigid structural PU foam moldings has achieved extraordinary industrial importance, the processes described have problems due to the increased environmental awareness with respect to the blowing agents used. Worldwide, fluorochloroalkanes, preferably trichlorofluoromethane, are employed on a large scale as blowing agents and first evaporate under the influence of the exothermic polyaddition reaction, then partially condense on the cooler internal surface of the mold at super-atmospheric pressure and are included in the moldings. The only disadvantage of these blowing gases is environmental pollution, since they are suspected of participating in the degradation of the ozone layer in the stratosphere.

In order to reduce the amount of fluorochloroalkanes, the blowing agent predominantly used is water, which reacts with the polyisocyanate to form carbon dioxide, which acts as the actual blowing gas. This process has the disadvantage that the carbon dioxide formed does not condense on the internal surface of the mold under the reaction conditions present in the mold and thus results in the formation of moldings having a porous surface.

According to DE-A-1 804 362 (GB 1,285,224), PU foams having a compact surface and a cellular core can be produced in the presence of alkali metal aluminosilicates having a zeolite structure. The blowing agent used is, in particular, a halogenated hydrocarbon or a mixture of halogenated hydrocarbons and partially hydrated alkali metal aluminosilicates or organic compounds containing wager of hydration. The addition of water and the alkali metal aluminosilicate is said to give shrinkage-free structural PU foam moldings having overall densities of up to 120 g/l, in spite of the presence of chlorofluorocarbons.

Chlorofluorocarbon-free, rigid PU foam moldings having high surface hardness and a density of at least 300 kg/m$^3$ are described in EP-A-0 319 866 (U.S. Pat. No. 4,882,363). They are produced using polyhydroxyl compounds or a mixture of organic polyhydroxyl compounds having a mean hydroxyl functionality of at least 2.2 and a mean hydroxyl number of at least 300 mg of KOH/g, water and/or carbon dioxide as blowing agent and a zeolite absorbant additive having a diameter of the pore opening to the absorption cavities of at least 0.7 nm.

Zeolite-modified, water-blown polurethane foams which are distinguished by improved flame resistance and contain no halogen- and/or phosphorus-containing flame-proofing agents are described in EP-A-0 388 952. According to U.S. Pat. No. 4,518,718, closed-cell, rigid polyurethane foams having relatively high heat resistance can be produced by reacting polyols with polyisocyanates, a zeolite able to absorb molecules having an effective critical diameter of up to 0.1 run being added to each of these starting components.

A process for the production of soft-elastic polyurethane moldings having a cellular core and a compact peripheral zone by RIM is described in German Patent Application P 40 34 082.1. The additives used are crystalline, microporous molecular sieves and/or crystalline silicon dioxide. Although this process gives moldings having good mechanical properties and an essentially pore-free, smooth surface, the process also has disadvantages, for example the difficult and technically complex preparation of the microporous, crystalline molecular sieve and silicon dioxide and the considerable amount of these additives which must be introduced into the polyurethane formulation in order to give polyurethane moldings having the desired compact peripheral zone and an essentially pore-free surface.

It is an object of the present invention to provide urethane-containing moldings having a cellular core and a compacted peripheral zone with an essentially pore-free, smooth surface by a simple, inexpensive process without using chlorofluorocarbons. Suitable polyurethane formulations should be easy to handle, have good flow properties and be readily processable by RIM or the low-pressure process, even in the absence of chlorofluorocarbons, which act as diluents.

We have found that, surprisingly, this object is achieved by using an amorphous, microporous silica gel to produce the structural PU foam moldings.

The present invention accordingly provides a process for the production of chlorofluorocarbon-free urethane-containing moldings having a cellular core and a compacted peripheral zone, by reacting a) an organic and/or modified organic polyisocyanate with
b) at least one relatively high-molecular-weight compound containing at least two reactive hydrogen atoms and, if desired,
c) a low-molecular-weight chain extender and/or crosslinking agent, in the presence of
d) a blowing agent,
e) a catalyst, f) additives and, if desired, g) assistants, in a closed mold with compaction, wherein one of the additives (f) is an amorphous, microporous silica gel.

In spite of the addition of the amorphous, microporous silica gel and the attendant increase in the viscosity of the components, the latter have very good flow properties and can easily be processed by RIM or the low-pressure process. The rigid, semirigid or preferably soft-elastic structural PU foam moldings produced have a peripheral zone of relatively high density and a smooth, essentially pore-free and bubble-free surface. The Shore A hardness of the surface and the other mechanical properties correspond to those of structural foam moldings expanded using a chlorofluorocarbon.

The following applies to components (a), (b) and (d) to (f) and, if used, (c) and (g) which can be used for the process according to the invention and to the amorphous, microporous silica gel which is suitable according to the invention:

Suitable organic polyisocyanates (a) are aliphatic, cycloaliphatic, araliphatic and preferably aromatic polyisocyanates.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and preferably aromatic diisocyanates and polyisocyanates, e.g. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, i.e. products which are obtained by chemical reaction of organic diisocyanates and/or polyisocyanates. Specific examples are ester-, urea-, biuret-, allophanate-, carbodiimide-, isocyanurate-, uretdione- and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate or 2,4- or 2,6-tolylene diisocyanate modified by means of low-molecular-weight diols, triols, dialkylene glycols, trialkylene glycols or polyoxyalkylene glycols having molecular weights of up to 4200, specific examples of di- and polyoxyalkylene glycols, which can be employed individually or as mixtures, being diethylene glycol, dipropylene glycol, polyox-yethylene glycol, polyoxlrpropylene glycol and polyoxypropylene-polyoxyethylene glycol. NCO-containing prepolymers containing from 25 to 3.5% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, e.g. based on 4,4'-, 2,4'- and/or 2,2'-diphenylmethane diisocyanate and/or 2,4- and/or 2,6-tolylene diisocyanate, have also proven successful.

The modified polyisocyanates may be mixed with one another or with unmodified organic polyisocyanates, e.g. 2,4'- or 4,4'-diphenylmethane diisocyanate, crude MDI or 2,4- and/or 2,6-tolylene diisocyanate.

Further organic polyisocyanates which have proven particularly successful and are preferred for use for the preparation of the soft-elastic or semirigid structural polyurethane foe moldings are NCO-containing prepolymers containing from 25 to 9% by weight of NCO, in particular based on polyether- or polyester-polyols and one or more diphenylmethane diisocyanate isomers, advantageously 4,4'-diphenylmethane diisocyanate and/or modified urethane-containing organic polyisocyanates containing from 33.6 to 15% by weight of NCO, in particular based on 4,4'-diphenylmethane diisocyanate or diphenylmethane diisocyanate isomer mixtures, mixtures of 2,4- and 2,6-tolylene diisocyanates, mixtures of tolylene diisocyanates and crude MDI or, in particular, mixtures of the abovementioned prepolymers based on diphenylmethane diisocyanate isomers and crude MDI. The aromatic polyisocyanates, modified aromatic polyisocyanates or polyisocyanate mixtures expediently have a mean functionality of from 2 to 2 . 6, preferably from 2 to 2.4, in particular from 2 to 2.2. Rigid structural polyurethane foam moldings are preferably produced using urethane-modified aromatic polyisocyanates having a functionality of greater than 2.6, expediently from 2.8 to 3.5, in particular crude MDI.

If, for specific areas of application, moldings having a light-stable surface are required, for example for internal paneling in automobiles or for neck supports, they are preferably produced using aliphatic or cycloaliphatic polyisocyanates, in particular modified polyisocyanates based on hexamethylene 1,6-diisocyanate or isophorone diisocyanate, or mixtures of said diisocyanates, if desired with diphenylmethane diisocyanate and/or tolylene diisocyanate isomers.

The relatively high-molecular-weight compound (b) containing at leas t two reactive hydrogen atoms expediently has a functionality of from 2 to 8, and a molecular weight of from 500 to 8500, the relatively high-molecular-weight compounds (b) for the production of soft-elastic and semirigid structural polyurethane foam moldings having a functionality of preferably from 2 to 3, in particular from 2.0 to 2.6, and a molecular weight of preferably from 1800 to 6000, in particular from 2000 to 5000, and the relatively high-molecular-weight compounds (b) for the production of rigid structural polyurethane foam moldings having a functionality of preferably from 3 to 8, in particular from 3 to 6, and a molecular weight of preferably from 500 to 3200, in particular from 600 to 2400. Particular success has been achieved using polyols selected from the group comprising the polyether-polyols, polyester-polyols, polythioetherpolyols, hydroxyl-containing polyester-amides, hydroxyl-containing polyacetals, hydroxyl-containing aliphatic polycarbonates and polymer-modified polyether-polyols, or mixtures of at least two of said polyols. Particular preference is given to polyester-polyols and/or polyether-polyols.

Suitable polyester-polyols may be prepared, for example, from organic dicarboxylic acids having from 2 to 12 carbon atoms, preferably aliphatic dicarboxylic acids having from 4 to 6 carbon atoms and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or mixed with one another. The free dicarboxylic acids may also be replaced by the corresponding dicarboxylic acid derivatives, for example dicarboxylic acid mono- and/or diesters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35: 35 to 50: 20 to 32 parts by weight, and in particular adipic acid. Examples of dihydric and polyhydric alcohols, in particular diols and alkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane and pentaerlrthritol. Preference is given to ethanediol, diethylene glycol, 1,4-butanediol, 1,5-pentanediol, 1,6-hexanediol, glycerol and mixtures of at least two of said diols, in particular mixtures of 1,4-butanediol, 1,5-pentanediol and 1,6-hexanediol and/or glycerol. Furthermore, polyesterpolyols made from lactones, e.g. ε-caprolactone or hydroxycarboxylic acids, e.g. ω-hydroxycaproic acid, may also be employed.

The polyester-polyols may be prepared by polycondensing the organic, e.g. aromatic and preferably aliphatic polycarboxylic acids and/or derivatives thereof and polyhydric alcohols without using a catalyst or preferably in the presence of an esterification catalyst, expediently in an inert gas atmosphere, e.g. nitrogen, carbon monoxide, helix, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 3, in particular from 2 to 2.6, and a molecular weight of from 1200 to 3600, preferably from 1500 to 3000, in particular from 1800 to 2500.

However, the preferred polyols are polyetherpolyols prepared by conventional processes, for example by anionic polymerization using alkali metal hydroxides, such as sodium hydroxide or potassium hydroxide, or alkali metal alkoxides, such as sodium methoxide, sodium ethoxide, potassiumethoxide or potassium isopropoxide as catalysts and with addition of at least one initiator molecule containing from 2 to 8, preferably 2 or 3, reactive hydrogen atoms in bound form for polyetherpolyols for the production of semirigid and soft-elastic structural PU foam moldings and preferably from 3 to 8, in particular from 3 to 6, reactive hydrogen atoms in bound form for polyether-polyols for the production of rigid structural PU foam moldings, or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, e.g. ethanolamine, N-methyl- and N-ethylethanolamine, dialkanolamines, e.g. diethanolamine, N-methyl- and N-ethyl-diethanolamine, and trialkanolamines, e.g. triethanolamine, and ammonia. Preference is given to polyhydric alcohols, in particular dihydric and/or trihydric alcohols and/or dialkylene glycols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or mixtures of at least two polyhydric alcohols and, if desired, water.

The polyether-polyols, preferably polyoxypropylene- and polyoxypropylene-polyox-yethylene-polyols, have, as stated above, a functionality of from 2 to 8 and molecular weights of from 500 to 8500, and suitable polyoxtetramethylene glycols have a molecular weight of up to approximately 3500, preferably from 600 to 2200.

Other suitable polyether-polyols are polymermodified polyether-polyols, preferably graft polyether-polyols, in particular those based on styrene and/or acylonitrile and prepared by in situ polymerization of acylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tert-amino groups in bound form, and/or melamine and are described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. Further ore, they may be mixed with the polymer-modified polyether-polyols or polyester-polyols and the hydroxyl-containing polyester-amides, polyacetals and/or polycarbonates.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared by reacting diols, such as 1,3-propanediol, 1,4-butanediol and/or 1,6-hexanediol, diethylene glycol, trioxyethylene glycol or tetraoxyethylene glycol, with diaryl carbonates, e.g. diphenyl carbonate, or phosgene.

The hydroxyl-containing polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

The urethane-containing rigid, semirigid and preferably soft-elastic moldings having a compacted peripheral zone and a cellular core may be prepared with or without the use of chain extenders and/or crosslinking agents (c). However, it may prove advantageous, in order to modify the mechanical properties, for example the hardness, to add chain extenders, crosslinking agents or, if desired, mixtures thereof. The chain extenders and/or crosslinking agents used are low-molecular-weight polyhydric alcohols, preferably diols and/or triols, having a molecular weight of less than 480, preferably from 60 to 300. Examples are aliphatic, cycloaliphatic and/or araliphatic diols having from 2 to 14 carbon atoms, preferably from 4 to 10 carbon atoms, e.g. ethylene glycol, 1,3-propanediol, 1,10-decanediol, o-, m- and p-dihydrox-ycyclohexane, diethylene glycol, triethylene glycol, dipropylene glycol, tripropylene glycol and preferably 1,3-butanediol, 1,4-butanediol, 1,6-hexanediol and bis(2-hydroxyethyl)hydroquinone, triols, such as 1,2,4- and 1,3,5-trihydroxycyclohexane, trianethylolethane, glycerol and trimethylolpropane, and low-molecular-weight hydroxyl-containing polyalkylene oxides, e.g. having a molecular weight of up to 480, based on ethylene oxide and/or 1,2-propylene oxide, and the initiator molecules mentioned above for the preparation of polyether-polyols.

Other suitable chain extenders are N,N'-dialkyl-substituted aromatic diamines, which are unsubstituted or substituted on the aromatic radical by alkyl groups, having 1 to 20, preferably 1 to 4, carbon atoms in the N-alkyl radical, e.g. N,N'-diethyl-, N,N'-di-sec-pentyl-, N,N'-di-sec-hexyl-, N,N'-di-sec-decyl- and N,N'-dicyclohexyl-, p- and m-phenylenediamine, N,N'-diethyl-, N,N'-diethyl-, N,N'-diisopropyl-, N,N'-di-sec-butyl- and N,N'-dicyclohexyl-4,4'-diaminodiphenylmethane and N,N'-di-secbutylbenzidine.

If the compounds of component (c) are used, they can be employed in the forth of mixtures or individually and are advantageously used in amounts of from 1 to 50 parts by weight, preferably from 3 to 40 parts by weight, based on 100 parts by weight of the relatively high-molecular-weight compounds (b).

The blowing agent (d) used is preferably water, which reacts with the organic, modified or unmodified polyisocyanate (a) to form carbon dioxide and urea groups and thereby affects the compressive strength of the end products. Since the amount of water present in the amorphous, microporous silica gel used according to the invention which can be up to 20% by weight, preferably from 3 to 20% by weight, based on the total weight, depending on the pore size and voluble, is usually sufficient, there is frequently no need for a separate addition of water. If, however, the water must additionally be introduced into the polyurethane formulation to achieve the desired density, it is usually used in amounts of from 0.05 to 5% by weight, preferably from 0.1 to 3% by weight, in particular from 0.1 to 1% by weight, based on the weight of components (a) to (c).

The blowing agent (d) used may, instead of water, or preferably in combination with water and the amorphous, microporous silica gel which is suitable according to the invention, also be a low-boiling liquid which evaporates under the influence of the exothermic polyaddition reaction and advantageously has a boiling point at atmospheric pressure in the range from $-40°$ to $120°$ C., preferably from $10°$ to $90°$ C., or a gas.

The liquids of the abovementioned type and the gases which are suitable as blowing agents can be selected, for example, from the group comprising the alkanes, e.g. propane, n- and isobutane, n- and isopentane and preferably technical-grade pentane mixtures, cycloalkanes and cycloalkenes, e.g. cyclobutane, cyclopentene, cyclohexene and preferably cyclopentane and/or cyclohexane, dialkyl ethers, e.g. dimethyl ether, methyl ethyl ether or diethyl ether, cycloalkylene ethers, e.g. furan, ketones, e.g. acetone and methyl ethyl ketone, carboxylates, such as ethyl acetate and methyl formate, carboxylic acids, such as formic acid, acetic acid and propionic acid, fluoroalkanes, which are degraded in the troposphere and are therefore benign to the ozone layer, e.g. trifluoromethane, difluoromethane, difluoroethane, tetrafluoroethane and heptafluoroethane, and gases, e.g. nitrogen, carbon monoxide and noble gases, e.g. helium, neon and krypton.

The most expedient amount of low-boiling liquid and gases, which may in each case be employed individually as liquid or gas mixtures or as gas/liquid mixtures, depends on the density desired and on the amounts of amorphous, microporous silica gel or silica gel and water employed. The amounts necessary can easily be determined by simple preliminary experiments. Satisfactory results are usually given by amounts of from 0.5 to 20 parts by weight, preferably from 2 to 10 parts by weight, of liquid and from 0.01 to 30 parts by weight, preferably from 2 to 20 parts by weight, of gas, in each case based on 100 parts by weight of component (b) and, if used, (c).

As stated above, perfluorochlorocarbons are not used as the blowing agent.

The catalysts (e) used to produce the moldings having a compacted peripheral zone and a cellular core are, in particular, compounds which greatly accelerate the reaction of the hydroxyl-containing compounds of component (b) and, if used, (c) with the organic, modified or unmodified polyisocyanate (a). Suitable compounds are organometallic compounds, preferably organotin compounds, such as tin(II) salts of organic carboxylic acids, e.g. tin(II) diacetate, tin(II) dioctanoate, tin(II) diethylhexanoate and tin(II) dilaurate, and dialkyltin(IV) salts of organic carboxylic acids, e.g. dibutyltin diacetate, dibutyltin dilaurate, dibutyltin maleate and dioctyltin diacetate. Also suitable are dialkyltin(IV) mercapto compounds, e.g. bislauryltin(IV) dimercaptide, and compounds of the formula $R_2Sn(SR'-O-CO-R'')_2$ or $R_2Sn(SR'-CO-OR'')_2$ where R is alkyl having at least 8 carbon atoms, R' is alkylene having at least 2 carbon atoms and R'' is alkyl having at least 4 carbon atoms. Specific examples of catalysts of this type, which are described, for example, in DD-A-218 668, are dioctyltin bis(thioethylene glycol 2-ethylhexanoate), dioctyltin bis(thioethylene glycol laurate), dioctyltin bis(2-ethylhexyl thiolatoacetate), dioctyltin bis(hexyl thiolatoacetate) and dioctyltin bis(lauryl thiolatoacetate). Other catalysts which have proved particularly successful are organotin compounds containing tin-oxygen or tin-sulfur bonds, as described, for example, in DD-A-255 535, of the formula $(R_3Sn)_2O$, $R_2SnS$, $(R_3Sn)_2S$, $R_2Sn(SR')_2$ or $RSn(SR')_3$ where R and R' are alkyl having 4 to 8 carbon atoms in the case of R and having 4 to 12 carbon atoms in the case of R', and R' is alternatively $-R''COOR'''$ or $-R''OCOR'''$ where R'' is alkyl having 1 to 6 carbon atoms and R''' is alkylene having 4 to 12 carbon atoms. Specific examples of these compounds are bis(tributyltin) oxide, dibutyltin sulfide, dioctyltin sulfide, bis(tributyltin) sulfide, dibutyltin bis(2-ethylhexyl thioglycolate), dioctyltin bis(2-ethylhexyl thioglycolate), octyltin tris(2-ethylhexyl thioglycolate), dioctyltin bis(thioethylene glycol 2-ethylhexanoate) and dibutyltin bis(thioethylene glycol laurate).

The organometallic compounds can be employed in the for, of individual catalysts or in the form of catalyst combinations. It has proven extremely advantageous to use a combination comprising 94% by weight of di-n-octyltin bis(2-ethylhexyl thioglycolate) and 6% by weight of mono-n-octyltin tris(2-ethylhexyl thioglycolate).

The organometallic compounds may furthermore employed in combination with highly basic amines, for example amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethyldiaminodicyclohexylmethane, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and, preferably, 1,4-diazabicyclo[2.2.-2]octane and alkanolamine compounds such as triethanolamine, triisopropanolamine, N-methyl- and N-ethyldiethanolamine and dimethylethanolamine.

Suitable catalysts, in particular if a large excess of polyisocyanate is used, are tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, alkali metal formates and acetates, such as potassium formate and potassium acetate and alkali metal salts of long-chain fatty acids having from 10 to 20 carbon atoms and possibly containing lateral OH groups. From 0.001 to 5% by weight, in particular from 0.05 to 2% by weight of catalyst or catalyst combination is preferably used, based on the weight of component (b).

The essential feature of the present invention is the use of amorphous, microporous silica gel as the additive (f). Silica gels of this type which can be used according to the invention have a chemical composition which contains at least 80% by weight, preferably more than 90% by weight, in particular more than 95% by weight, based on the total weight, of silicon dioxide.

In addition to silicon dioxide, the suitable silica gels may additionally contain metal oxides, preferably oxides of aluminum, titanium, zirconium, magnesium, niobium, iron or zinc, or at least two of these metal oxides, and water. Preference is given to silica gels which comprise only water and silicon dioxide.

The amorphous, microporous silica gels which can be used according to the invention advantageously have a mean pore diameter of from 0.1 to 10 nm, preferably from 0.5 to 5 nm, in particular from 0.7 to 3 nm, particularly preferably from 1 to 2.5 nm. The frequency of occurrence of the mean pore diameter in said ranges is expediently more than 40%, preferably more than 50%, in particular more than 60%. The pore volume of the amorphous, microporous silica gels which are suitable according to the invention is advantageously in the range from 0.15 to 1.8 ml/g, preferably from 0.2 to 1.1 ml/g, in particular from 0.3 to 0.6 ml/g. The porosity of these silica gels, and thus the pore volume, can be determined by titration, for example using water, by a method as described by A. Y. Mottlau and N. E. Fisher in Anal. Chem., Vol. 34 (6) (1962), pages 714–715.

If the pore volume of the amorphous, microporous silica gel is determined from a gas sorption isotherm curve, which is parallel to the abscissa, measured at 77 K using nitrogen, the mean pore diameter is calculated in accordance with the BJH model (E. P. Barrett, L. G. Joyner, P. P. Halenda, J. Amer. Chem. Soc., Vol. 73 (1951), 373–380).

The amorphous, microporous silica gels which can be used according to the invention give equivalent specific surface areas, calculated using the BET method (S. Brunauer, P. H. Enunett, E. Teller, J. Amer. Chem. Soc., Vol. 60 (1938), pages 309 to 319) of, advantageously, from 200 to 900 $m^2/g$, preferably from 300 to 900 $m^2/g$, particularly from 320 to 800 $m^2/g$.

A further characteristic of the silica gels which can be used according to the invention may be the absorption isotherm curve. In gas adsorption measurements carried out in accordance with the prior art using nitrogen at a temperature of 77 K, the silica gels which can be used according to the invention may have an isotherm whose shape is known as type I (K. S. W. Sing, D. M. Everett, R. A. W. Haul, L. Moscou, R. A. Pierotti, J. Rouquerol and T. Siemieniewska, Pure and Appl. Chem., Vol. 57 (4) (1985), pages 603 to 619).

The amorphous, microporous silica gels which can be used according to the invention are known and commercially available. Processes for their preparation and their properties are described, for example, by R. K. Iler in The Chemistry of Silica, Wiley-Interscience, New York, 1979, and by K. K. Unger in Porous Silica, Journal of Chromatography Library, Volume 16, Elsevier Scientific Publishing Company, Amsterdam, 1979.

The amorphous, microporous silica gels which can be used according to the invention may be used individually or in the form of a mixture of at least two silica gels having different specifications. Depending on the desired properties of the structural PU foam moldings to be produced, it may prove expedient to use mixtures of silica gels which differ, for example, in pore volume, pore diameter and/or water content. This measure allows the blowing reaction and the compaction to be regulated in an advantageous manner and easily to be matched to the given process equipment, or allows modification of the mechanical properties of the end product overall or in certain regions of the molding. It is furthermore possible to use combinations of amorphous, microporous silica gels of isotherm type I with amorphous, mesoporous silica gels of isotherm type IV. Mixtures of this type advantageously allow production of moldings having a cellular core, a compact peripheral zone and extremely low overall density.

To produce chlorofluorocarbon-free, urethane-containing moldings having a cellular core and a compacted peripheral zone, a suitable gel is expediently used in an amount of from 0.5 to 50% by weight, preferably from 1 to 20% by weight, in particular from 2 to 8% by weight, based on the weight of starting component(s) (b) or (b) and (c).

The amorphous, microporous silica gel may be employed in a commercially available particle size. In order to improve the shelf life and to simplify handling of the silica gel-containing system component, the amorphous, microporous silica gel used expediently has a particle size of from 0.5 to 200 $\mu$m, preferably from 3 to 40 $\mu$m, in particular from 5 to 10 $\mu$m. In order to improve the processing properties and to additionally extend the shelf life of the system component, it has furthermore proven expedient to use a suitable mixer, for example a three-roll mill, to prepare a concentrate which comprises at least one amorphous, microporous silica gel and at least one relatively high-molecular-weight compound containing at least two reactive hydrogen atoms, after adjusting the precise water content of the silica gel to the desired value. The concentrate may simply be mixed with the other starting components or added directly to the reaction mixture.

For the preparation of customized PU formulations for certain applications, for example for motor vehicle steering wheels of low density or for shoe soles, it may prove advantageous to use one or more amorphous, microporous silica gels in combination with crystalline, microporous molecular sieves.

Crystalline, microporous molecular sieves which have proved particularly suitable for this purpose are those which have a cavity diameter of less than 1.3 nm and comprise metal oxides or metal phosphates, expediently selected from the group comprising oxides or phosphates of aluminum, boron, iron, chromium, vanadium, beryllium, antimony, arsenic, gallium, silicon, germanium, titanium, zirconium or hafnium, so that molecular sieves of this type are preferred. Other molecular sieves which are suitable for this purpose are mixed oxides which essentially comprise aluminum/silicon oxide, boron/silicon oxide, iron(III)/silicon oxide, gallium/silicon oxide, chromium(III)/silicon oxide, beryllium/silicon oxide, vanadium/silicon oxide, antimony(V)/silicon oxide, arsenic(III)/silicon oxide, titanium(IV)/silicon oxide, aluminum/germanium oxide, boron/germanium oxide, aluminum/zirconium oxide and aluminum/hafnium oxide or exclusively silicon dioxide. Other suitable metal oxides are zeolites having a cavity diameter of from 0.74 to 0.41 run and preferably having an $SiO_2:Al_2O_3$ ratio of $\geq 6$. The zeolites may, for example, have a pentasil, faujasite, mordenite, erionite, chabasite, zeolite A or offretite structure. Preferred crystalline, microporous molecular sieves are mordenite in the H form, Na form or ammonium form, offretire in the H form, K form, Na form or ammonium form, zeolite ZSM-5 in the H form, Na form or ammonium form, zeolite ZSM-11, zeolite ZSM-12, betazeolite, clinoptilite, ferrierite, ultrastable Y-zeolite, ultrastable mordenite and silicalites, in particular mordenite in the H form or Na form or silicalites, or mixtures of these molecular sieves, in combination with the amorphous, microporous silica gel.

If such mixtures of amorphous, microporous silica gel and crystalline, microporous molecular sieve are used, they expediently contain from 1 to 40% by weight, preferably from 3 to 12% by weight, of at least one of these molecular sieves which have a cavity diameter of less than 1.3 nm and comprise metal oxides or metal phosphates, based on the weight of the amorphous, microporous silica gel.

In addition to the amorphous, microporous silica gel or mixture of amorphous, microporous silica gel and crystalline, microporous, molecular sieve which is essential to the invention, other additives (f) and, if desired, assistants (g) can also be used to produce the urethane-containing, preferably soft-elastic moldings having a cellular core, a compacted peripheral zone and an essentially pore-free, smooth surface. Specific examples are surfactants, foam stabilizers, cell regulators, lubricants, fillers, dyes, pigments, flameproofing agents, hydrolysis-protection agents, and fungistatic and bacteriostatic substances.

Examples of suitable surfactants are compounds which serve to support homogenization of the starting materials and may also regulate the cell structure. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, e.g. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric polyacrylates containing polyoxyalkylene and fluoroalkane radicals as side groups. The surfactants are usually used in amounts of from 0.01 to 5 parts by weight, based on 100 parts by weight of component (b).

A particularly successful lubricant is a ricinoleic acid polyester having a molecular weight of from 1500 to 3500, preferably from 2000 to 3000, which is expediently employed in an amount of from 0.5 to 10% by weight, preferably from 5 to 8% by weight, based on the weight of component (b) or of components (b) and (c).

For the purposes of the invention, fillers, in particular reinforcing fillers, are conventional organic and inorganic fillers, reinforcing agents, weighting agents, coating agents, etc. Specific examples are inorganic fillers, such as silicate minerals, for example phyllosilicates, such as antigorite, serpentine, hornblendes, amphiboles, chrysotile, and talc; metal oxides, such as kaolin, aluminum oxides, aluminum silicate, titanium oxides and iron oxides, metal salts, such as chalk, baryte and inorganic pigments, such as cadmium sulfide, zinc sulfide and glass particles. Examples of suitable organic fillers are carbon black, melamine, colophony, cyclopentadienyl resins and graft polymers.

The inorganic and organic fillers may be used individually or as mixtures and are advantageously introduced into the reaction mixture in amounts of from 0.5 to 50% by weight, preferably from 1 to 40% by weight, based on the weight of components (a) to (c).

Examples of suitable flameproofing agents are tricresyl phosphate, tris-(2-chloroethyl) phosphate, tris-(2-chloropropyl)phosphate, tris(1,3-dichloropropyl) phosphate, tris-(2,3-dibromopropyl) phosphate and tetrakis(2-chloroethyl)ethylene diphosphate.

In addition to the abovementioned halogen-substituted phosphates, it is also possible to use inorganic flameproofing agents, such as red phosphorus, expandable graphite, alumina oxide hydrate, antimony trioxide, arsenic oxide, ammonium polyphosphate and calcium sulfate, or cyanuric acid derivatives, e.g. melamine, or mixtures of two or more flameproofing agents, e.g. expandable graphite and ammonia polyphosphate, ammonium polyphosphates and melamine, and also, if desired, expandable graphite and/or starch, in order to flameproof the moldings produced according to the invention. In general, it has proven expedient to use from 2 to 50 parts by weight, preferably from 5 to 25 parts by weight, of said flameproofing agents or mixtures per 100 parts by weight of components (a) to (c).

Further details on the other conventional assistants and additives mentioned above can be obtained from the specialist literature, for example from the monograph by J. H. Saunders and K. C. Frisch, High Polymers, Volume XVI, Polyurethanes, Parts 1 and 2, Interscience Publishers 1962 and 1964 respectively, or Kunststoff-Handbuch, Polyurethane, Volume VII, Carl-Hahset-Verlag, Munich, Vienna, 1st and 2nd Editions, 1966 and 1983.

To produce the moldings, the organic modified or unmodified polyisocyanate (a), the relatively high-molecular-weight compound containing at least two reactive hydrogen atoms (b) and, if used, the low-molecular-weight chain extender and/or crosslinking agent are reacted in such amounts that the equivalence ratio between the NCO groups of the polyisocyanate (a) and the total number of reactive hydrogen atoms of component (b) and, if used, (c) is from 0.85 to 1.50:1, preferably from 0.95 to 1.15:1, in particular from 0.9 to 1.1:1.

The urethane-containing, rigid, semirigid or preferably soft-elastic moldings according to the invention can be produced by the prepolymer method or preferably by the one-shot process using the low-pressure method or the high-pressure method, in a closed, expediently heatable mold, for example a metallic mold, e.g. made of aluminum, cast iron or steel, or a mold made from a fiber-reinforced polyester or epoxy molding material. However, due to the good flow properties and the improved processing properties of the formulations, the moldings are preferably produced by reaction injection molding (RIM). These procedures are described, for example, by Piechota and Röhr in Integralschaumstoff, Carl-Hanser-Verlag, Munich, Vienna, 1975; D. J. Prepelka and J. L. Wharton in Journal of Cellular Plastics, March/April 1975, pages 87 to 98, U. Knipp in Journal of Cellular Plastics, March/April 1973, pages 76 to 84 and in the Kunststoff-Handbuch, Volume 7, Polyurethane, 2nd Edition, 1983, pages 333 ff.

It has proven particularly advantageous to use the two-component method and to combine components (b), (d), (e), (f) and, if used, (c) and (g) in component (A) and to use the organic polyisocyanate, the modified polyisocyanate (a) or the mixture of said polyisocyanates and, if desired, the blowing agent (d) as component (B).

The starting components are mixed at from 15° to 80° C., preferably at from 25° to 55° C., and introduced into the closed mold, if desired at superatmospheric pressure. The mixing can be carried out mechanically by means of a stirrer or a stirring screw or under high pressure by the countercurrent injection method. The mold temperature is expediently from 20° to 120° C., preferably from 30° to 80° C., in particular from 45° to 60° C. The degree of compaction is in the range from 1.1 to 8.3, preferably from 2 to 7, in particular from 2.4 to 4.5.

The amount of reaction mixture introduced into the mold is advantageously such that the moldings obtained have an overall density of from 0.06 to 1.2 g/cm$^3$, the microcellular, elastic moldings preferably having an overall density of from 0.7 to 1.2 g/cm$^3$, in particular from 0.8 to 1.0 g/cm$^3$, the rigid and semirigid moldings preferably having an overall density of from 0.1 to 0.9 g/cm$^3$, in particular from 0.35 to 0.8 g/cm$^3$, and the soft-elastic moldings preferably having an overall density of from 0.2 to 0.7 g/cm$^3$, preferably from 0.4 to 0.7 g/cm$^3$.

The microcellular, elastic moldings produced by the process according to the invention are used in the automobile industry, for example, as bumper covers, shock absorbers, bump strips, rain gutters and for other body parts. They are also suitable as industrial housing parts, for example for radios or TV sets, photocopiers or computers, as office furniture and as castors. The soft-elastic moldings are used, for example, as arm rests, head rests and safety panels in the interior of motor vehicles, as sports articles and as bicycle and motorcycle saddles. They are also suitable as inners for ski boots or as shoe soles. They are particularly suitable as steering wheels for vehicles. The semirigid moldings are suitable as dashboards and side panels in vehicles, as ski cores and particularly for coating metallic containers, preferably metal barrels for beverages, for example alcoholic or alcohol-free beverages, such as beer or fruit juice. The rigid moldings are used in the furniture industry, in the building industry and in snow cats and snow ploughs.

EXAMPLE 1

Component A: a mixture comprising

| | |
|---|---|
| 60.80 | parts by weight of a glycerol-initiated polyoxypropylene (86.5% by weight)-polyoxyethylene (13.5% by weight)-polyol having an OH number of 35, |
| 11.18 | parts by weight of a glycerol-initiated polyoxypropylene (81.5% by weight)-polyoxyethylene (18.5% by weight)-polyol having an OH number of 29, |
| 18.90 | parts by weight of an ethylene diamine-initiated polyoxypropylene-polyol having an OH number of 768, |
| 1.0 | part by weight of a 33% strength by weight solution of triethylenediamine in dipropylene |

| | -continued |
|---|---|
| | glycol, |
| 0.02 | part by weight of a silicone-based foam stabilizer (stabilizer OS 50 from Bayer AG), |
| 0.1 | part by weight of a dispersant (Isol ® 4R002 from ISL-Chemie, Cologne) |
| 2.0 | parts by weight of a pigment paste (Isopur ® braun SA 01130/8311 from ISL-Chemie, Cologne) and |
| 6.0 | parts by weight of a silica gel concentrate comprising, based on the total weight, 50% by weight of a microporous silica gel made from silicon dioxide having the following specification: |
| crystallinity (X-ray diffractometry) | amorphous |
| gas sorption BET surface area: (nitrogen sorption, 77K) | 682 m$^2$/g |
| BET analysis C-value: | 2450 |
| pore volume (p/pp* = 0.98): | 0.345 ml/g |
| mean pore diameter: | 1.5–2.5 nm |
| isotherm type: (BDDT classification) | type I |
| water titration (Mottlau-Fisher): | 0.35–0.41 ml/kg |
| bulk density: | 0.57–0.69 kg/l |
| water content (from drying loss at 160° C.): | 14.6% by weight |

(BET: S. Brunauer, P.H. Emmett, E. Teller
BDDT: S. Brunauer, L. Deming. W. Deming, E. Teller, J. Amer. Chem. Soc. Vol. 62 (1940), pages 1723 to 1732) and 50% by weight of a glycerol-initiated polyoxypropylene (86.5% by weight)-polyoxyethylene (13.5% by weight)-polyol having an OH number of 35.

Component B:

A urethane-containing quasi-prepolymer containing 28% by weight of NCO and prepared by reacting a mixture of 55 parts by weight of 4,4'-diphenylmethane diisocyanate and 45 parts by weight of a mixture of diphenylmethane diisocyanates and polyphenyl-polymethylene polyisocyanates with 9 parts by weight of a polyoxypropylene glycol having a hydroxyl number of 250.

100 parts by weight of component A and 50 parts by weight of component B were mixed at 25° C. by reaction injection molding in a Putomar ®80/40 high-pressure metering unit from Elastogran Polyurethane GmbH, Maschinenbau, 8021 StraFlach, and introduced into a metallic mold of internal dimensions 200×200×40 mm at 50° C. in such an amount that a degree of compaction of 3.6 was produced when the mold was closed.

The molding was removed after 3.5 minutes. A semirigid polyurethane sheet having a cellular core, a compacted peripheral zone and a pore-free surface having a Shore A hardness of 96 was obtained.

If the reaction mixture was allowed to expand in an open mold, a foam block having an overall density of 240 gl was obtained. An initiation time of 25 seconds and a rise time of 85 seconds were measured.

In accordance with Example 1, semirigid structural polyurethane foam moldings in the context of the invention are taken to mean products which have the following mechanical properties:

an overall density (in accordance with DIN 53 420) of from 0.1 to 0.9 g/cm$^3$, in particular from 0.35 to 0.8 g/cm$^3$ an elongation at break (in accordance with DIN 53 504) of from 10 to 300%, in particular from 50 to 100%, and a hardness (in accordance with DIN 53 504) of from Shore A 80 to Shore D 70, in particular from Shore A 95 to 98.

Semirigid structural polyurethane foam moldings of this type having high impact resilience are used, in particular, for coating metal barrels in the beverages industry, preferably beer barrels.

EXAMPLE 2

Component A: a mixture comprising

| | |
|---|---|
| 61.98 | parts by weight of a glycerol-initiated polyoxypropylene (86.5% by weight)-polyoxyethylene (13.5% by weight)-polyol having a hydroxyl number of 35, |
| 20.12 | parts by weight of a graft polyether-polyol having a hydroxyl number of 28, prepared from a glycerol-initiated polyoxypropylene-polyoxyethylene-polyol as the graft base and a mixture of styrene and acrylonitrile in the weight ratio 12:8 as the graft (Polyurax U 26-03 from BP, Germany), |
| 1.0 | part by weight of a 33% strength by weight solution of triethylenediamine in ethylene glycol, |
| 1.0 | part by weight of glycerol (99.5% by weight), |
| 3.82 | parts by weight of ethylene glycol, |
| 6.04 | parts by weight of black paste N from Bayer AG and |
| 6.04 | parts by weight of the silica gel concentrate as in Example 1. |

Component B: a mixture comprising 50 parts by weight of a urethane-containing quasi-prepolymer having an NCO content of 23% by weight, prepared by reacting 4,4'-diphenylmethane diisocyanate with a mixture of dipropylene glycol and a polyoxypropylene glycol having a hydroxyl number of 250, and 50 parts by weight of a carbodiimide-containing polyisocyanate mixture having an NCO content of 29.5% by weight, prepared by partial carbodiimidization of 4,4'-diphenylmethane diisocynate.

100 parts by weight of component A and 43.0 parts by weight of component B were mixed at 22° C. by reaction injection molding in a Puromat ® 80/40 high-pressure metering unit from Elastogran Polyurethane GmbH, Maschinenbau business area, 8021 StraFlach, and the mixture was introduced into a metallic mold at 45° C. having the spatial shape of an automobile steering wheel in such an amount that a degree of compaction of 4 was produced on expansion.

The molding was demolded after 3.5 minutes. It had a cellular core, a compacted peripheral zone and a compact, pore-free surface having a Shore A hardness of 72.

Foaming of the reaction mixture in an open mold gave a foam element having an overall density of 195 g/l. An initiation time of 20 seconds and a rise time of 90 seconds were measured during this foam reaction.

In accordance with Example 2, soft-elastic structural polyurethane foam moldings in the context of the invention are taken to mean products which have an overall density (in accordance with DIN 53 420) of from 0.2 to 0.7 g/cm$^3$, preferably from 0.4 to 0.7 g/cm$^3$, and a hardness (in accordance with DIN 53 505) of from Shore A 40 to 80, preferably from 55 to 75.

EXAMPLE 3

Component A: a mixture comprising

| | |
|---|---|
| 46.04 | parts by weight of a glycerol-initiated polyoxypropylene (86.5% by weight)-polyoxyethylene (13.5% by weight)-polyol having a hydroxyl |

-continued

| | |
|---|---|
| | number of 35, |
| 26.03 | parts by weight of a graft polyether-polyol having a hydroxyl number of 28, prepared from a glycerol-initiated polyoxypropylene-polyoxyethylene-polyol as the graft base and a mixture of styrene and acrylonitrile in the weight ratio 12:8 as the graft (Polyurax U 26-03 from BP, Germany), |
| 1.0 | part by weight of a 33% strength by weight solution of triethylenediamine in ethylene glycol, |
| 0.6 | part by weight of glycerol (99.5% by weight), |
| 6.41 | parts by weight of 1,4-butanediol, |
| 6.41 | parts by weight of black paste N from Bayer AG, |
| 5.12 | parts by weight of γ-butyrolactone and |
| 8.4 | parts by weight of the silica gel concentrate as in Example 1. |

Component B: a mixture comprising 50 parts by weight of a urethane-containing quasi-prepolymer having an NCO content of 28% by weight, prepared by reacting a mixture of 55 parts by weight of 4,4'-diphenylmethane diisocyanate and 45 parts by weight of a mixture of diphenylmethane diisocyanates and polyphenylpolymethylene polyisocyanates with 9 parts by weight of a polyoxypropylene glycol having a hydroxyl number of 250, and 50 parts by weight of a carbodiimide-containing polyisocyanate mixture having an NCO content of 29.5% by weight, prepared by partial carbodiimidization of 4,4'-diphenylmethane diisocyanate.

100 parts by weight of component A and 45.0 parts by weight of component B were mixed at 22° C. by reaction injection molding in a Puromat ® 30 P high-pressure metering unit from Elastogran Polyurethane GmbH, Maschinenbau business area, 8021 StraFlach, and the mixture was introduced into a metallic mold at 45° C. having the internal dimensions 200×200×40 mm in such an amount that a degree of compaction of 2.2 was produced on expansion after the mold was closed.

The molding was demolded after 4 minutes. A soft-elastic polyurethane sheet having a cellular core, a compacted peripheral zone and a pore-free surface having a Shore A hardness of 96 was obtained.

Foaming of the reaction mixture in an open mold gave a foam element having an overall density of 185 g/l. initiation time of 18 seconds and a rise time of 88 seconds were measured during this foam reaction.

We claim:

1. A process for the production of chlorofluorocarbon-free, urethane-containing moldings having a cellular core and a compacted peripheral zone, by reacting
   a) an organic and/or modified organic polyisocyanate with
   b) at least one polyol with a functionality of from 2 to 8 and a molecular weight of from 500 to 8500, and
   c) optionally, a low-molecular-weight chain extender and/or cross-linking agent,
in the presence of
   d) a blowing agent,
   e) a catalyst,
   f) additives, and
   g) optionally, assistants,
in a closed mold with compaction, wherein one of the additives (f) is an amorphous, microporous silica gel.

2. A process as claimed in claim 1, wherein the amorphous, microporous silica gel has a mean pore diameter with a frequency of occurrence of more than 40% in the range from 0.1 to 10 nm.

3. A process as claimed in claim 1, wherein the amorphous, microporous silica gel has a pore volume in the range from 0.15 to 1.8 ml/g.

4. A process as claimed in claim 1, wherein the amorphous, microporous silica gel has a BET surface area in the range from 200 to 900 $m^2/g$.

5. A process as claimed in claim 1, wherein the amorphous, microporous silica gel has a chemical composition which contains at least 80% by weight, based on the total weight, of silicon dioxide.

6. A process as claimed in claim 1, wherein the amorphous, microporous silica gel has a chemical composition which, in addition to silicon dioxide, additionally contains an oxide of aluminum, titanium, zirconium, magnesium, niobium, iron or zinc, or at least two of these metal oxides.

7. A process as claimed in claim 1, wherein the amorphous, microporous silica gel is used in an amount of from 0.5 to 50% by weight, based on the weight of starting components (b) or (b) and (c).

8. A process as claimed in claim 1, wherein the additive (f) is used in the form of a concentrate comprising at least one amorphous, microporous silica gel and at least one polyol (b) with a functionality of from 2 to 8 and a molecular weight of from 500 to 8500.

9. A process as claimed in claim 1, wherein the additive (f) used is an amorphous, microporous silica gel in combination with a microporous, crystalline molecular sieve.

10. A process as claimed in claim 1, wherein the additive (f) used is an amorphous, microporous silica gel in combination with a microporous, crystalline molecular sieve from the group comprising the mordenites in the H or Na form, the silicalites, and mixtures of these molecular sieves.

11. A process as claimed in claim 1, wherein the amorphous, microporous silica gel is used in combination with a blowing agent (d) selected from the group consisting of water a physical blowing agent, and a mixture of water and a physical blowing agent, with the exception of chlorofluorocarbons.

12. A process as claimed in claim 1 wherein the blowing agent comprises water.

13. A process as claimed in claim 1, wherein the chlorofluorocarbon-free, urethane-containing moldings are soft-elastic, semirigid or rigid.

14. A process as claimed in claim 1, wherein the chlorofluorocarbon-free, urethane-containing moldings are produced by RIM o the low-pressure process.

15. A process as claimed in claim 1 for coating metal containers.

16. The process of claim 15 wherein said metal container is a beverage container.

17. A process as claimed in claim 1 for the production of steering wheels for vehicles.

* * * * *